United States Patent
Greene et al.

(10) Patent No.: US 12,545,607 B2
(45) Date of Patent: Feb. 10, 2026

(54) TREATMENT OF PRODUCED WATER

(71) Applicants: Kyle Greene, Carmangay (CA); Steven Paul Baerg, Hythe (CA); Jason Clemett, Calgary (CA)

(72) Inventors: Kyle Greene, Carmangay (CA); Steven Paul Baerg, Hythe (CA); Jason Clemett, Calgary (CA)

(73) Assignee: FORMULA FLUID SYSTEMS LTD., Calgary (CA)

( * ) Notice: Subject to any disclaimer, the term of this patent is extended or adjusted under 35 U.S.C. 154(b) by 697 days.

(21) Appl. No.: 17/642,206

(22) PCT Filed: Sep. 10, 2020

(86) PCT No.: PCT/CA2020/051223
§ 371 (c)(1),
(2) Date: Mar. 10, 2022

(87) PCT Pub. No.: WO2021/046647
PCT Pub. Date: Mar. 18, 2021

(65) Prior Publication Data
US 2022/0315462 A1     Oct. 6, 2022

Related U.S. Application Data

(60) Provisional application No. 62/898,062, filed on Sep. 10, 2019.

(51) Int. Cl.
*C02F 1/14* (2023.01)
*C02F 1/66* (2023.01)
*C02F 1/74* (2023.01)
*C02F 9/00* (2023.01)
(Continued)

(52) U.S. Cl.
CPC .............. *C02F 1/74* (2013.01); *C02F 1/66* (2013.01); *C02F 9/00* (2013.01);
(Continued)

(58) Field of Classification Search
CPC ...... C02F 1/74; C02F 1/66; C02F 9/00; C02F 2101/006; C02F 2101/10; C02F 2101/203;
(Continued)

(56) References Cited

U.S. PATENT DOCUMENTS 3,617,559 A * 11/1971 Cywin ..................... C02F 9/00
423/633
3,927,173 A * 12/1975 Melzer ..................... C02F 1/72
423/632
(Continued)

FOREIGN PATENT DOCUMENTS

WO     WO2014089443 A1     6/2014

OTHER PUBLICATIONS

Water Science and Technology; London vol. 70, Iss. 2, (Jul. 2014): 209-217 (Year: 2014).*
(Continued)

*Primary Examiner* — Pranav N Patel
(74) *Attorney, Agent, or Firm* — Nathan V. Woodruff

(57) ABSTRACT

A method of treating contaminated water that has ferrous ions and at least one additional mineral in solution includes the steps of: adding a sufficient quantity of a caustic agent to the contaminated water to achieve a basic pH, and adding oxygen to the contaminated water to achieve a molar ratio of oxygen to ferrous iron of at least 1:10. The pH and the oxygen concentration are sufficient to produce ferrous hydroxide ($Fe(OH)_2$) from ferrous ions and ferric hydroxide ($Fe(OH)_3$) from the ferrous hydroxide while limiting colloidal iron formation, at least the ferric hydroxide forming a precipitate. The precipitate is separated from the contaminated water.

14 Claims, 4 Drawing Sheets

(51) Int. Cl.
*C02F 101/00* (2006.01)
*C02F 101/10* (2006.01)
*C02F 101/20* (2006.01)
*C02F 101/32* (2006.01)
*C02F 103/10* (2006.01)

(52) U.S. Cl.
CPC .... *C02F 2101/006* (2013.01); *C02F 2101/10* (2013.01); *C02F 2101/203* (2013.01); *C02F 2101/327* (2013.01); *C02F 2103/10* (2013.01)

(58) Field of Classification Search
CPC ............ C02F 2101/327; C02F 2103/10; C02F 1/722; C02F 1/78; E21B 43/34
See application file for complete search history.

(56) References Cited

U.S. PATENT DOCUMENTS

| | | | |
|---|---|---|---|
| 4,451,361 A | 5/1984 | Paterson | |
| 5,427,691 A * | 6/1995 | Kuyucak | C01F 11/46 210/721 |
| 2012/0145646 A1 * | 6/2012 | Bae | C02F 1/5236 210/702 |
| 2012/0248667 A1 * | 10/2012 | Leonard | B60G 11/27 267/122 |
| 2014/0326677 A1 | 11/2014 | Kinasewich et al. | |

OTHER PUBLICATIONS

Bosman, D J. "Lime Treatment of Acid Mine Water and Associated Solids/Liquid Separation." Water Science and Technology 15 (1983): 71-84. (Year: 1983).*
Stumm, W. and Lee, F. G., "Oxygenation of Ferrous Iron", Industrial and Engineering Chemistry, vol. 53, 143-146, Feb. 1961, American Chemical Society.
Written Opinion of the International Preliminary Examining Authority mailed on Feb. 5, 2021 issued in corresponding International Application No. PCT/CA2020/051223, filed Sep. 10, 2020, 8 pages.

* cited by examiner

TREATMENT OF PRODUCED WATER

TECHNICAL FIELD

This relates to a method of treating water, such as produced water from a hydrocarbon recovery operation, and in particular, a method of treating produced water to remove contaminants.

BACKGROUND

In hydrocarbon recovery operations, water is often used to stimulate production, to help in the production of the hydrocarbons, or to help separate hydrocarbons from produced material. The water must then be treated prior to reuse or disposal.

Produced water often contains iron, which is often problematic as it may interfere with hydraulic fracturing by agglomerating polymers used in slick water fracks and retarding the gelling process in gel based fracturing fluids. The iron may also stabilize emulsions that may include oil or solids in the produced water, which increases the difficulty of separating these components from the produced water.

SUMMARY

According to an aspect, there is provided a method of treating contaminated water. The contaminated water may comprise ferrous ions and at least one additional mineral in solution. The method may comprise the steps of: adding a sufficient quantity of a caustic agent to the contaminated water to achieve a basic pH; adding oxygen to the contaminated water to achieve a molar ratio of oxygen to ferrous iron of at least 1:10; wherein the pH and the oxygen concentration are sufficient to produce ferrous hydroxide $(Fe(OH)_2)$ from ferrous ions and ferric hydroxide $(Fe(OH)_3)$ from the ferrous hydroxide while limiting colloidal iron formation, at least the ferric hydroxide forming precipitates; and separating the precipitates from the contaminated water.

According to other aspects, the method may include one or more of the following elements, alone or in combination: the caustic agent and the oxygen may be injected upstream of a settling tank; the settling tank may comprise an inlet toward a bottom of the settling tank that receives the contaminated water, and the method further comprising controlling an oxygen concentration within the contaminated water such that at least a portion of the ferric hydroxide is produced after a water level in the settling tank is above the inlet and permitting the precipitate to settle within the settling tank; the contaminated water may be injected into the settling tank in batches, and a portion of the precipitates may remain in the treatment tank and causes heterogeneous nucleation in the contaminated water of a subsequent batch; the oxygen may be injected toward a bottom of a floatation tank, such that the oxygen promotes the formation of ferric hydroxide and causes at least a portion of the precipitates to rise toward a top of the tank; at least a portion of the ferrous hydroxide may act as a coagulant and breaks hydrocarbon-based colloids in the contaminated water; at least a portion of the ferric hydroxide may act as a flocculant such that the precipitate comprises flocks of the ferric hydroxide and the at least one additional mineral; the contaminated water may have a pH of between about 7.5 and 8; the contaminated water may be brine water; the at least one additional mineral may comprises Ca, Mg, Fe, Ba, Sr, NORMs, or combinations thereof; the contaminated water may further comprise BTEX and liquid hydrocarbons; the contaminated water may comprise NORMs in solution, and the pH of the contaminated water may be sufficiently low to avoid the formation of NORM-precipitates; the precipitate may be separated as a sludge, and wherein the pH of the sludge may be reduced to cause the ferric hydroxide to become soluble and form an iron oxide precipitate.

According to another aspect, there is provided a system for treating contaminated water comprising ferrous ions and at least one additional mineral in solution, the system comprising: an inlet connected to a source of contaminated water; a caustic agent input connected to inject caustic agent into the contaminated water; an oxygen input connected to inject oxygen into the contaminated water; a treatment tank having an inlet for receiving the contaminated water, the treatment tank having a sludge outlet for removing precipitates, and a water outlet for removing treated water; and a controller that is programmed to control the injection of caustic agent to achieve a basic pH and oxygen to achieve a molar ratio of oxygen to ferrous iron of at least 1:10 in the contaminated water, and such that ferrous hydroxide $(Fe(OH)_2)$ is produced from ferrous ions and ferric hydroxide $(Fe(OH)_3)$ is produced from the ferrous hydroxide while limiting colloidal iron formation.

According to other aspects, the system may comprise one or more of the following features, alone or in combination: the caustic agent input and the oxygen input may be upstream of the inlet of the treatment tank, and the inlet and the sludge outlet may be toward a bottom of the treatment tank, and wherein the controller may be programmed to further control the injection of oxygen such that at least a portion of the ferric hydroxide is produced after a water level in the settling tank is above the inlet. the oxygen input may be a diffused air injector positioned toward a bottom of the treatment tank that injects oxygen into the treatment tank; sufficient caustic agent may be injected to achieve a pH of between about 7.5 and 8; the controller may be programmed to further control the injection of caustic agent to avoid pH levels at which NORM precipitates form; there may be a sludge treatment tank that is connected to receive precipitates from the sludge outlet in a fluidized state, and an acid input connected to inject a pH-lowering agent into the precipitates.

Other aspects will be apparent from the description, drawings, and claims contained herein.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF PREFERRED EMBODIMENTS

There will now be described a method of treating contaminated water, such as produced water from a hydrocarbon recovery operation.

The contaminated water may contain various contaminants to be reduced or removed before the water is suitable for reuse in the hydrocarbon recovery operation or disposal. In some examples, produced water may contain a TDS (total dissolved solids concentration) of between 3-21%, including the following minerals: ferrous iron ($Fe^{2+}$), minerals associated with hard water such as Si, Ca, Mg, Fe, etc., barium, strontium, suspended solids (silicates, clay, iron complexes, etc.), BTEX (benzene, toluene, ethylbenzene and xylene), liquid hydrocarbons, etc. In some examples, the ferrous iron concentration may be between about 10-1000 ppm. In general, ferrous iron is reactive with sulphides to form iron sulphides, and therefore, the contaminated water considered herein will typically be "sweet" (i.e. have a low sulphur content), such that there is a substantial ferrous iron component in the contaminated water. The discussion below may be applied to remove iron from water along with other types of contaminants. It will be understood that the types of contaminants will vary depending on the particular formation with which the water is used, and other treatment process may be applied prior to the present method, or after the present method. The particular composition of the contaminated water that is suitable for treatment using the teachings contained herein will be apparent to those skilled in the art once the teachings are understood.

Figure 1:
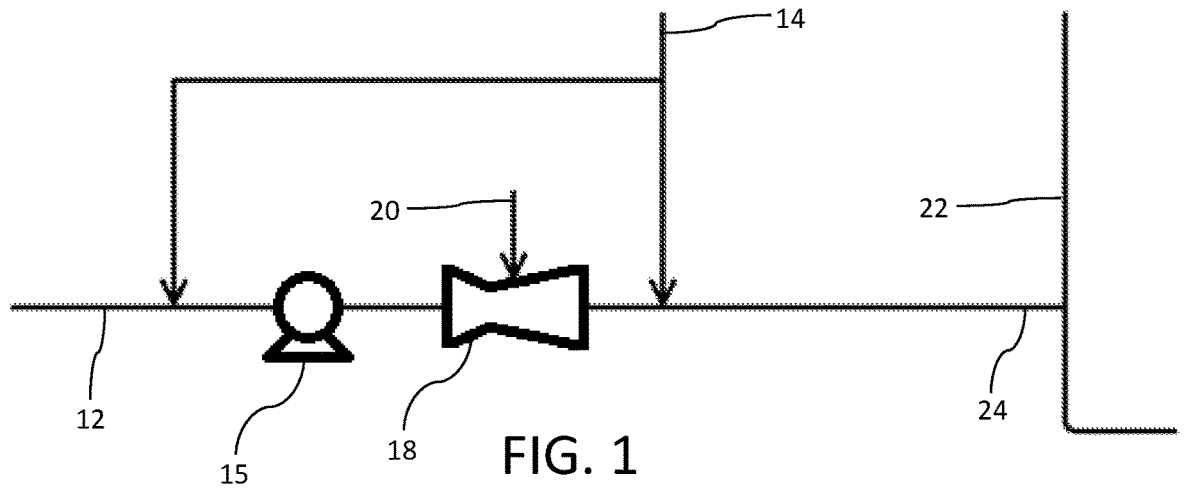
FIG. 1 is a schematic of a settling treatment tank for contaminated water.
Figure 2:
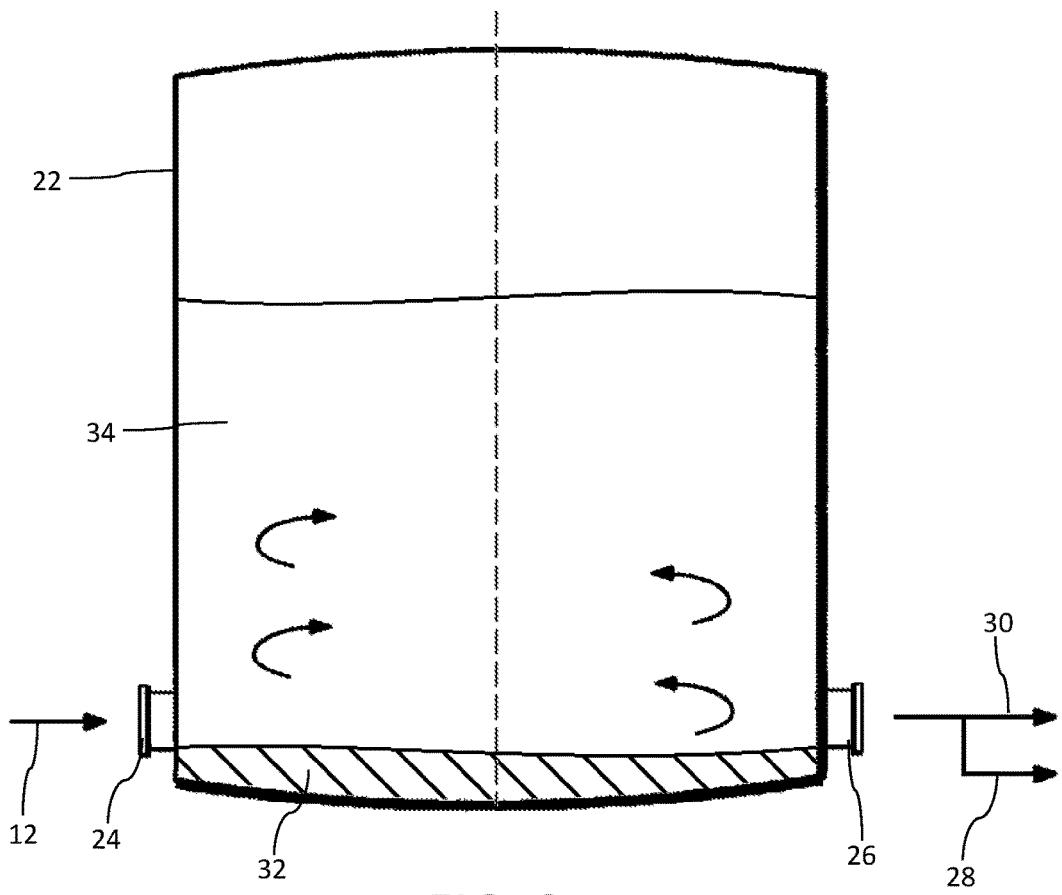
FIG. 2 is a schematic of an inlet stream for the treatment tank of FIG. 1.

As a first step, the pH of the water is increased so that it has a basic pH. In one example, adequate results were achieved by raising the pH to about 7.8 through the addition of caustic, such as NaOH and/or CaOH. In general, a pH of at least 7.5 is found acceptable in order to achieve the desired reactions in a suitable amount of time, and a pH of greater than 8 may not be preferred given the additional cost of the caustic agent required to raise the pH further and the potential for the formation of undesireable precipitates. as will be discussed below will provide adequate results. The contaminated water is also aerated to achieve the desired reaction. An example of a process is shown in FIGS. 1 and 2, which depicts a batch method in which the caustic agent is added through line 14 and air is added through line 20 prior to entering a settling tank 22. It will be understood that different equipment and steps may be used than those described and depicted herein. For example, caustic may be added at various points along fluid line 24, such as at different locations as shown in FIG. 1, and wherever the user determines is a suitable location to achieve adequate mixing and beneficial results in the reaction. In addition, referring to FIG. 4, treatment may involve dissolved air floatation (DAF), where air is injected toward the bottom of tank 22, such as via a diffusion tower or other dissolved air injector 52, which may be located within tank 22. This approach may allow water to be treated as a continuous process or as a batch process. Air may also be injected in more than one location, if suggested by the circumstances.

Referring again to FIG. 1, in the depicted example water to be treated is carried through line 12 and passed through a venturi 18, which injects air through air inlet 20 in order to aerate the water. The air injected through air inlet 20 may be any oxygen-containing gas, such as atmospheric air. A pH adjusting substance, such as caustic, is added into line 12 through caustic inlet 14. As depicted, caustic may be added before and after the water passes through venture 18. Alternatively, caustic may be added only before or only after venturi 18. A pump 15 may be included along line 12. As depicted, pump 15 is placed upstream of venturi 18 and after caustic inlet 14, which may encourage mixing of caustic and water to condition the pH in the water. The amount of caustic and air that is added into the water to be treated is controlled as described herein. Other means of controlling the pH and adding oxygen in a controlled manner that are known may also be used.

Referring to FIG. 2, once pH-conditioned and oxygenated, the water is transferred to a treatment tank 22 that has a contaminated water inlet 24, and an outlet 26, which is separated into a solids line 28 and a treated water line 30. In most circumstances, the solids being removed will be a fluidized mixture with sufficient water to move through solids line 28 If required, the solids may be fluidized using known equipment to achieve a desired level of fluidity within solids line 28. The separation of sludge and water may be accomplished using known techniques and various equipment (not shown). Alternatively, solids line 28 and water line 30 may be connected to separate outlets on tank 22.

Preferably, inlet 24 is designed to reduce chaotic turbulence within tank 22. As shown, inlet 24 of treatment tank 22 is located toward the bottom of tank 22 and may be in the bottom of the tank if space permits. This is done such that, once a sufficient water level is achieved, inlet 24 will be submerged and the turbulence that would otherwise be generated by a raised inlet. In addition, inlet 24 is preferably oriented at an angle relative to the central axis of tank 22 to create a swirling motion as tank 22 is filled with water. This is intended to produce a more predictable fluid flow within the tank and reduce chaotic turbulence. Other strategies to control turbulence in a desired manner may also be used, such as providing baffles within tank 22. It has been found that, while some turbulence and fluid interaction may be beneficial, such as to properly mix the components or disrupt colloids in the water, excess turbulence may reduce the effectiveness of the settling process and may be harmful to the flocks of precipitate that form. For example, the early part of the treatment process may be controlled to occur at the bottom of the tank where the turbulence is greatest. As the water enters the tank, the swirling turbulence may also stir up any sludge remaining from a previous batch treatment in the tank, which allows for heterogeneous nucleation to occur, as will be discussed below. It also promotes reactions with colloids. As tank 22 is filled from the bottom, the reactions may be completed as the treatment water reaches the top, and as the water level increase and moves up in the tank, the turbulence will decrease, which allows larger flocks to form than would otherwise be the case. The flocs then begin settling down toward the bottom, and may collect other precipitated components as they move through the water.

If it is desired to have some sludge remain in tank 22 to promote heterogeneous nucleation as mentioned above, it may be desirable to position outlet 26 slightly above the bottom of tank 22, such that not all settled sludge is removed, and is able to be stirred up as the next batch of water to be treated is injected into tank 22.

Figure 4:
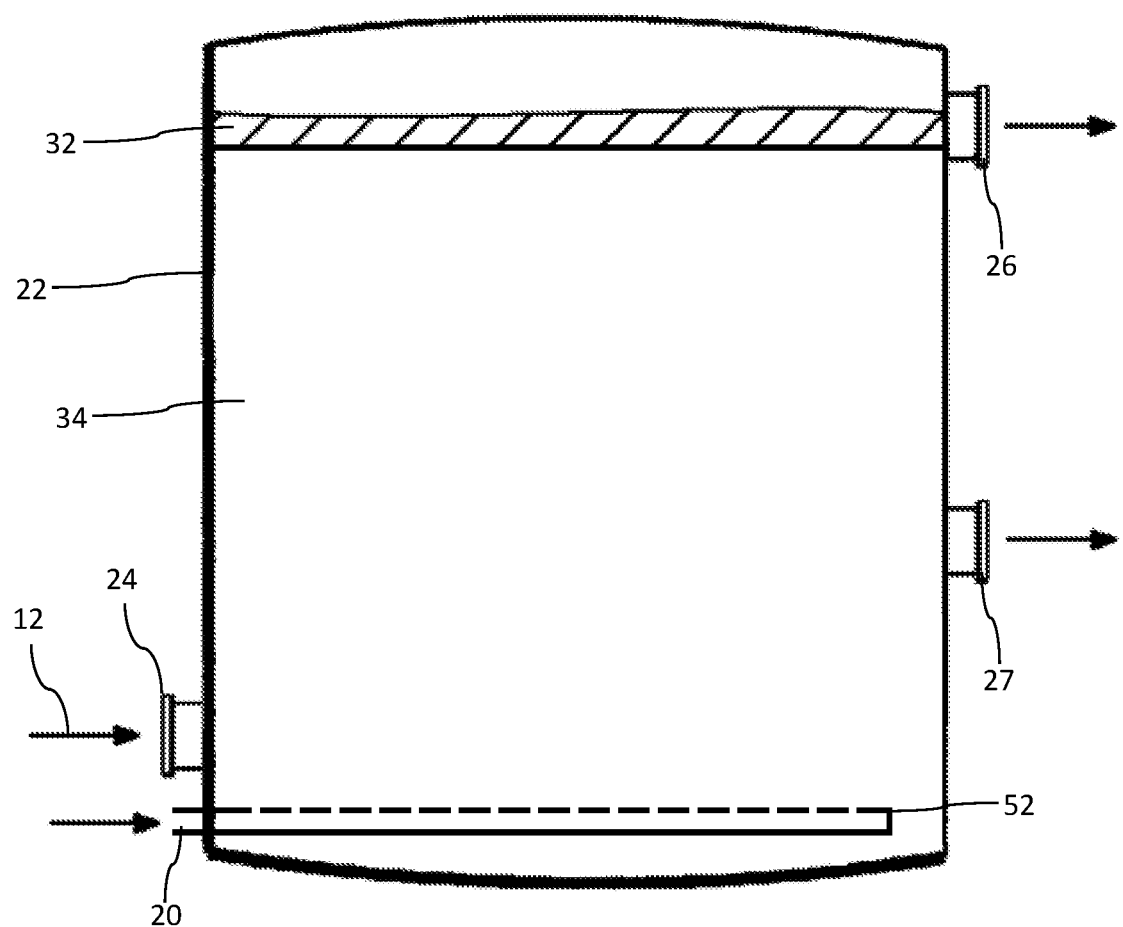
FIG. 4 is a schematic of a floatation treatment tank for contaminated water.

In another example, referring to FIG. 4, tank 22 may be designed to promote separation of the precipitate using DAF. Again, it is preferable to fill tank 22 from the bottom, which in this case, places the water to be treated adjacent to aerator 52. In this case, outlet 26 may be located toward the top of tank 22, which removes the fluidized sludge and treated water from tank 22. As outlet 26 is located at the top of tank 22, water treatment may proceed in a continuous process. There may be other outlets, such as outlet 27, that allows the removal of water from the middle of tank, if desired, or a drain (not shown) at the bottom of tank 22 to remove any solids that may collect, or to empty tank 22 for servicing. In contrast to the settling approach shown in FIG. 2, the use of dissolved air in FIG. 4 causes the sweeping flocculation to start from the bottom and go up. Furthermore, while the amount of oxygen in FIG. 2 may be controlled to cause the reaction to end when water reaches the top of tank 22, the example in FIG. 4 may inject a large quantity of oxygen in order to promote the reaction to occur as quickly as possible, such that precipitates form toward the bottom of tank 22, and float upward, where they may be collected and removed. It is generally expected that the sludge removed from a dissolved air floatation tank will have less water entrained, but will still be sufficiently fluid, and known techniques may be used to further fluidize the sludge, if required.

The embodiments disclosed above are given by way of example, and it will be understood that other tank designs, flow management, and mixing equipment for pH agents and oxygen may be used as are known in the art to achieve the desired reactions that treat the contaminated water.

There will now be given a discussion of the reactions that are used to treat the contaminated water. As the pH of the contaminated water is increased, such as to about 7.8 or more, the ferrous iron, $Fe^{2+}$ (aq), reacts with $OH^-$ to form ferrous hydroxide ($Fe(OH)_2$, which has limited solubility in water and therefore is a precipitate, according to the following reaction:

$$Fe^{2+}{}_{(aq)} + 2OH^-{}_{(aq)} \rightarrow Fe(OH)_2{}_{(s)}$$

The formation and precipitation of $Fe(OH)_2$ as described above will destabilize the iron-based oil emulsion in the contaminated water, releasing the oil to be separated. In addition, the ferrous hydroxide precipitate will act as a coagulant and coagulate with solids in the contaminated water, such as clay and other colloids to form larger particles that are easier to separate from the contaminated water.

The actual pH of the contaminated water will depend on various factors, such as the salinity of the water, where more saline water requires a higher pH. For example, in "fresh" water (i.e. water with very low salinity), it has been found that a pH of 7.2 may be sufficient. However, it has been found that a minimum pH is required to allow the desired reaction to occur, or in other words, to promote the precipitation of solids in a desired form, and that a higher pH may reduce the reaction time. The minimum pH may depend on the composition of the water being treated. A lower pH is generally preferred in order to reduce the cost of the pH agent additive, such as caustic, while allowing the reaction to occur in a reasonable timeframe.

In addition to iron-based compounds, other compounds and precipitates may be formed during the reactions in the contaminated water. For example, $CaCO_3$ and other carbonates may be formed from minerals in the contaminated water, as well as a minimal amount of other hydroxides, such as $Ba(OH)_3$ or $Sr(OH)_2$. It is preferred to control the conditioning of the contaminated water to reduce or avoid the formation of some undesireable precipitates, such as precipitates based on NORMs (Naturally Occurring Radioactive Materials) carried by the water, as these precipitates may require additional treatment steps prior to disposing of the recovered solids.

Figure 5:
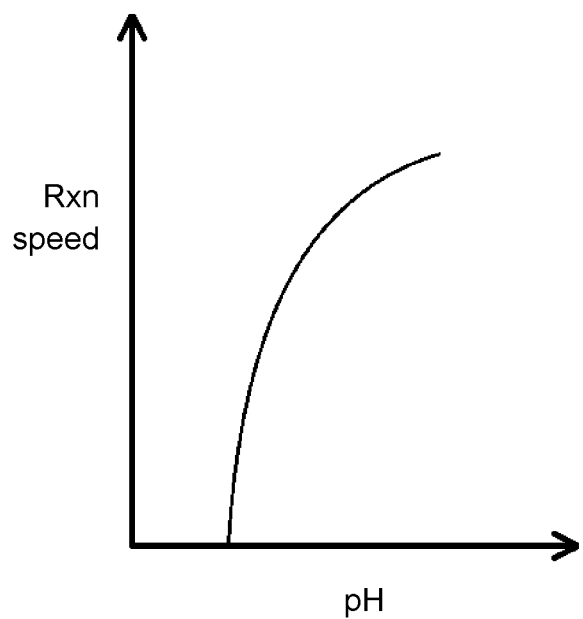
FIG. 5 is a plot of the general relationship between the pH and the speed of the reaction.

In general, a lower pH of the contaminated water will slow the reaction of the contaminants with the oxidants, and it is therefore desirable to ensure a sufficiently high pH to improve the reaction time and efficiency of the treatment process. However, when the pH is too high, there is an increase in caustic use, and an excess amount of sludge may form. This may also depend on whether the water is to be reused or disposed of, each of which may allow for different levels of contamination. This may also cause undesirable metals to precipitate out of solution, such as NORMs (Naturally Occurring Radioactive Materials), and it may be preferable to leave certain components in solution if the concentrations are within acceptable ranges for the intended purpose of the treated water. The general relationship between the pH and the speed of reaction is shown in FIG. 5. While the reaction speed increases with higher pH, this may not be desirable in some cases as it may increase costs and may promote the formation of undesireable precipitates. Furthermore, as the pH reaction occurs more quickly than the oxidation reaction, there may be little benefit to increasing the pH to increase the speed of the pH reaction during the treatment process. It has been found that the reaction due to the pH concentration occurs fairly early in the process and by appropriate design may be controlled to occur at a convenient time or location in the treatment process. This may also involve appropriate design of the structure. For example, with respect to the examples shown in FIGS. 2 and 4, the reaction may be timed to be complete prior to the water entering a separation tank or shortly after entering the tank.

In addition to adjusting the pH, the oxygen content of the contaminated water is controlled to ensure sufficient oxygen to react ferrous iron to ferric iron. This will typically require the introduction of oxygen into the contaminated water, typically through aeration, examples of which are shown in FIGS. 2 and 4. The water conditions are controlled to promote the following reaction:

$$Fe(OH)_2{}_{(s)} + O_2{}_{(aq)} + H_2O \rightarrow Fe(OH)_3{}_{(s)} + OOH$$

$$OOH + H_2O \rightarrow 3OH^-$$

According to the reaction, the ferrous iron (as ferrous hydroxide) in the water is free to react with oxygen in the water. This will typically occur whether the ferrous hydroxide is bound or unbound with clay or other colloids as discussed above. The ferrous hydroxide is then converted to ferric hydroxide, which acts as a flocculant for the solids and iron in the contaminated water. The resulting iron flocks are heavier than the contaminated water and will settle out along with any suspended solids or other solids that are flocculated together.

In general, it is expected that oxygen will react at a rate proportional to its concentration, such that a lower oxygen concentration will slow reactions with the contaminants, while a higher concentration will increase the reaction speed and therefore the overall treatment time. Despite this, it has been found that benefits may be had at lower concentration of oxygen. In particular, it was noted that a similar or even faster treatment time could be achieved at lower oxygen levels, while achieving a similar or higher level of treatment. In particular, it was found that smaller flocs of iron (III) hydroxide form at high oxygen concentrations, while a reduction in oxygen concentration in order to slow the reaction speed allows larger flocs to form. It was also found that high levels of turbulence that may be found in a treatment tank may cause the flocs to break into smaller pieces that do not separate easily in the treatment tank. This was observed in particular for brine water when using a settling tank, where its higher density relative to fresh or saline water, limits settling potential. Brine may be understood as having a salt concentration of about 3.5% or more, where the density increases with higher salt concentrations. As such, in the context of a settling tank, in one example, a controlled concentration of oxygen may be injected into the treatment water to control the reaction speed, and in particular, to allow a sufficient amount of the reaction to be completed in tank 22, and preferably in a portion of tank 22 where the turbulence is reduced. The actual oxygen concentration may depend on various factors, such as the flow rate of pump 16 into tank 22, the volume of tank 22, the amount of contaminants in water, etc. The injection of oxygen may take different forms, depending on the separation strategies used. For example, in a floatation tank as shown in FIG. 4, dissolved oxygen, such as atmospheric air, may be injected at the bottom of tank 22, represented by aerator 52, which may take different forms, and may be inside or outside tank 22, but is preferably distributed along the bottom of tank 22 to ensure an even application of oxygen to the water. The air allows the reaction to occur and also raises the flocs to the top as microbubbles adhere to the flocs, where they are removed. As the air is injected toward the bottom of tank 22, the reaction will preferably begin in the lower portion of tank 22 such that flocculation occurs as they rise to the top of tank 22. In some circumstances, it may be desirable to injects some air upstream of tank 22 (not shown) such that the reaction has started prior to entering tank 22.

In brine water, colloidal iron formation (such as iron oxide, iron hydroxide, or other forms of oxidized iron) is a common by product of the reaction of ferrous iron to ferric iron. However, when the density of the water is close to the density of the colloidal iron, the settling potential of the iron is limited. Using a combination of slow reaction kinetics and heterogeneous nucleation, the formation of large ferric hydroxide flocs may be encouraged instead. Using this combination, the iron precipitation limits colloidal iron formation, and improves the settling potential of the iron from the water.

When using a settling tank as shown in FIG. 2, it is preferable to slow the reaction such that it occurs primarily after the treatment tank is filled with water. This reduces the effect of turbulence generated by filling the tank. It has been found that turbulence may cause flocs to be broken up, and therefore reducing turbulence allows for the formation of larger particles that settle more quickly relative to what may be formed and settled out in turbulent water. In addition, a small amount of solids may remain in the treatment tank from previous treatment batches, which is stirred up in the treatment water as the tank is being filled. These solids may result in heterogeneous nucleation as the reaction progresses, which increases floc formation and settling potential.

Figure 6:
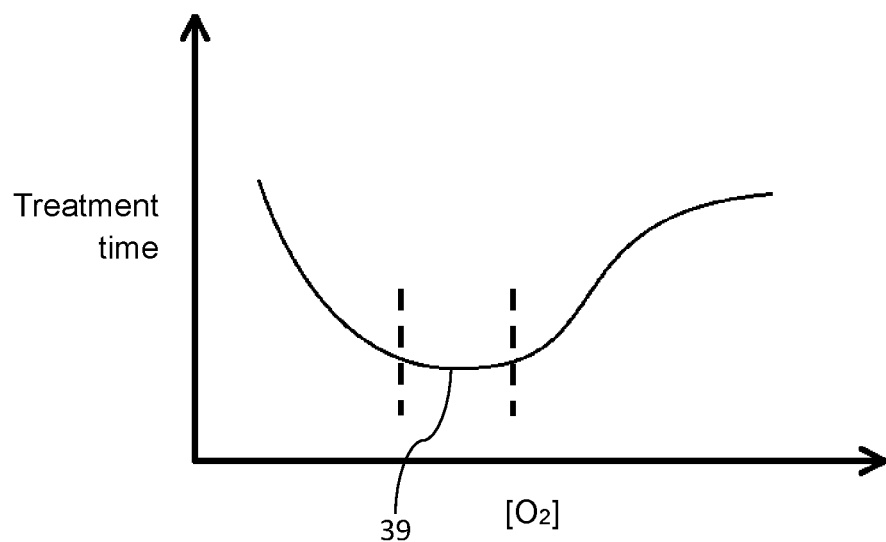
FIG. 6 is a plot of the general relationship between dissolved oxygen concentration and treatment time.

As noted previously, the actual oxygen concentration will depend on various factors, however in one example, it was found that the addition of air in concentrations of between about 10%-25% of the concentration of iron produced beneficial results. For example, if the water has an iron concentration of about 80 ppm, this will require a minimum of about 8 ppm of oxygen. However, it was found that an oxygen concentration of about 21 ppm caused a reaction that was too fast. By limiting the amount of oxygen to lower levels, it is possible to convert ferrous hydroxide, produced by reaction of ferrous iron with $OH^-$ in solution, to ferric hydroxide at a controlled, reduced rate than would otherwise be the case with a higher oxygen concentration, and to allow the reaction to occur within a less turbulent portion of tank 22 as discussed above. The slow formation of ferric hydroxide allows it to form into larger crystals that are stable. Not only are larger crystals easier to separate, ferric hydroxide is a flocculant that may then be used to help remove other precipitates, including hydroxides such as $Mg(OH)_2$, etc., suspended solids, and other solids in solution. The result is a "sweeping" flocculation as the ferric hydroxide settles out in the tank. In addition to using oxygen concentration to control the reaction and the formation of colloidal iron, there are some savings by reducing the amount of oxidant required in treating the water, as well as other savings related to reducing the costs related to post-chemical conditioning of the water, which would otherwise be required to counter the added oxidant. In addition, as the settling of precipitates and solids is generally faster in a treatment tank than would be the case with the formation of smaller flocs, the need for a further physical barrier or other physical separation processes to remove precipitated contaminants may be reduced. In general, it has been found that the relationship between oxygen concentration and total treatment time follows a curve similar to what is shown in FIG. 6. When optimizing the oxygen concentration, the goal is to reach the section of the curve labeled 39.

Relatively speaking, ferrous iron is slow to react with oxygen, while ferrous hydroxide is faster, and can be controlled with oxygen concentration. Metal hydroxide sludge is a by-product of the addition of caustic. However, as will be seen, this is partially reversed in the sludge treatment process.

In one example, oxygen concentrations of up to 50 ppm were tested for a particular contaminated water composition. While the reaction rates were increased significantly from moderate oxygen addition, smaller crystals were formed, which resulted in longer settling times. In another example, stronger oxidants (ozone, hypochlorous acid, peroxide) were tested, however these reactions formed $Fe_2O_3$, which is a light flocculant, but is also a very small crystal, which resulted in colloidal iron formation.

In some circumstances, it may be beneficial to limit the aeration of the water. It has been found that, by controlling the oxygen concentration, the reaction of $O_2$ and $Fe(OH)_2$ to form $Fe(OH)_3$ is slowed, such that oxygen slowly reacts with the aqueous iron and forms iron crystals. In the example of FIG. 2, tank 22 may be filled from the bottom, in such a way that there is a continuous mixing process within the tank. The filling process may take about 30-90 minutes, depending on the speed of the reaction and the size of the tank. The reaction occurs as the tank is filled and is managed in such a way that it results in a heterogenous nucleation of the iron. As described above, the reaction is preferably controlled to promote the formation of ferric hydroxide, which flocculates solids in water and promotes their precipitation. Ferric hydroxide may then form a large diffuse flow which flocculates solid in the water. Settling within the tank occurs when the reaction is complete, and the water stops moving. Solids may then be removed from the bottom of the tank as sludge and may be treated in a follow-up sludge treatment. Alternatively, when using DAF in tank 22 as shown in FIG. 4, the amount of oxygen may be higher, although it is also possible to increase aeration while still controlling the oxygen content, such as by increasing the amount of nitrogen or other gas being injected into tank 22.

As used herein, the term sludge refers to a thick, viscous mixture of liquid and solids that results from the separation process in the first treatment stage. The solids are those that settle or precipitate out from the contaminated water, such that the sludge is generally removed from the bottom of the tank as in FIG. 2, or the top as in FIG. 4. Once solids separate, the tank will be formed into layers, with sludge 32 at the bottom or top (as the case may be), and a water layer 34. Any liquid hydrocarbons (not shown) will generally float to the top of the water layer 34. In the example shown in FIG. 2, the hydrocarbons may be removed separately from the solids and water, which may not be possible in the example shown in FIG. 4. Alternatively, oil residue in the water may flocculate with the iron in the tank. Each layer may then be removed for further treatment, disposal, or for reuse as is known in the art.

Figure 3:
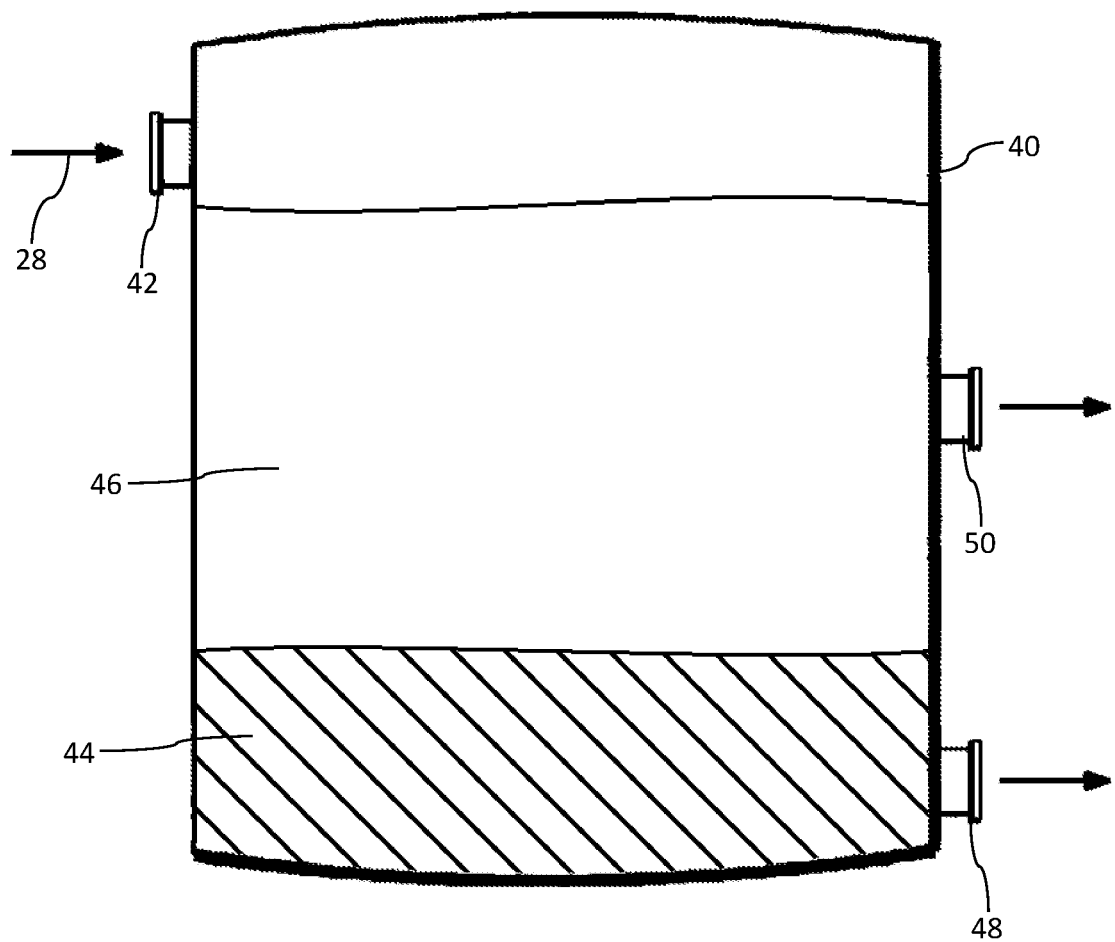
FIG. 3 is a schematic of a sludge treatment tank.

As noted, the sludge removed from the primary treatment tank 22 may be disposed of as is, or subjected to further treatment to recover more water and reduce the volume of the solids to be disposed. An example is shown in FIG. 3, in which sludge from the treatment tank is transferred to a sludge treatment tank 40 via inlet 42. In sludge treatment tank 40, ferric hydroxide reacts to produce ferric oxide and water. In addition, as ferric hydroxide is hydrated, water molecules will also released as a result of the reaction, such as in the following reaction:

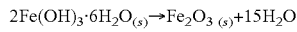

$$2Fe(OH)_3 \cdot 6H_2O_{(s)} \rightarrow Fe_2O_{3\,(s)} + 15H_2O$$

The reaction from ferric hydroxide to ferric oxide generally requires oxygen to be present as a catalyst, and in most cases, the sludge will have some residual oxygen from the treatment process. In some circumstances, oxygen levels may also be increased as is known in the art. As shown in FIG. 3, this reaction results in a layer of settled solids 44 at the bottom of sludge treatment tank 40, and a layer of water 46 above the settled solids 44. As in treatment tank 22, there may also be a layer of hydrocarbons (not shown). Sludge treatment tank 40 has a water outlet 50 to remove water that is released from the sludge, and a settled solids outlet 48, where the settled solids are densified relative to the sludge removed from tank 22. Given the nature of sludge treatment tank 40, the treatment process may be continuous, rather than in batches, where water and solids may be removed as needed once certain levels are reached. Additives that control the pH may be used, such as to lower the pH, as required.

In one example, the sludge from tank 22 may contain hydrated ferric hydroxide of the form $Fe(OH)_3 \cdot nH_2O$ that undergoes similar reactions to those described above in sludge treatment tank 40 to release water, and allow the sludge to decrease in volume by up to 1/10, yielding 0.1% sludge per volume of contaminated water that is injected into tank 22, and may be released at 1-10% of the sludge entering sludge treatment tank 40. The water released from the decomposition may be combined with the water recovered from treatment tank 22 to be re-used or disposed of, or may be directed to a separate stream for disposal or further use. As can be seen, while some additives may be desired, such as supplemental oxygen, a pH controlling additive, etc. the treatment of sludge within in tank 22 may be accomplished with little or no additional chemicals that would otherwise be used to help treat and dewater the sludge.

In typical iron removal systems in which ferrous iron is converted to iron (III) oxide in a treatment tank, the precipitated iron is physically separated from the system by a barrier method, chemical conditioning and floatation, centrifuge, filter press, or other sludge densification process. Using the formation of iron hydroxide, a hydrated flocculant is formed that mitigates the need for other chemicals of barrier methods to treat the iron. The sludge entering the sludge farm is already significantly less volume than typical methods because no other chemicals are added. This ferric hydroxide is hydrated. It will be understood that, while settling and floatation are the primary separation techniques used in the examples discussed above, other physical separation designs may also be used if beneficial to enhance or accelerate the separation and removal of contaminants. However, this will generally introduce additional equipment and energy costs, and it may be preferred to rely solely on settling and/or floatation in the treatment processes described above.

When treating the sludge in sludge treatment tank 40, the decomposition reaction may also react with oxygen and water to form an acid, which may result in the pH of the water decreasing over time. As the pH of the water decreases, the remaining metal hydroxides may become soluble as the hydroxide is released from the metal ion, such that there may be metal ions in the water when discharged from treatment tank 40, which may be beneficial for some industrial applications.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A method of treating contaminated water, the method comprising the steps of:
    adding a sufficient quantity of a caustic agent to the contaminated water to achieve a contaminated water pH that is basic, the contaminated water comprising ferrous ions and at least one additional mineral in solution;
    adding oxygen to the contaminated water to achieve a molar ratio of oxygen to ferrous iron of at least 1:10;
    wherein the contaminated water pH and the oxygen concentration are controlled such that:
        ferrous hydroxide $(Fe(OH)_2)$ is produced from ferrous ions;
        the ferrous hydroxide coagulates with non-ferrous colloids in the contaminated water;
        ferric hydroxide $(Fe(OH)_3)$ is produced from the ferrous hydroxide while limiting colloidal iron formation; and
        the ferric hydroxide forms flocculated particles with non-ferrous minerals in the contaminated water; and
    separating precipitates from the contaminated water.

2. The method of claim 1, wherein the caustic agent and the oxygen are injected upstream of a settling tank.

3. A method of treating contaminated water, the method comprising the steps of:
    upstream of a settling tank:
        adding a sufficient quantity of a caustic agent to the contaminated water to achieve a contaminated water pH that is basic, the contaminated water comprising ferrous ions and at least one additional mineral in solution; and
        adding oxygen to the contaminated water to achieve a molar ratio of oxygen to ferrous iron of at least 1:10;
    wherein:
        the contaminated water pH and the oxygen concentration are sufficient to produce ferrous hydroxide $(Fe(OH)_2)$ ferrous ions and ferric hydroxide $(Fe(OH)_3)$ from the ferrous hydroxide while limiting colloidal iron formation;

the ferrous hydroxide coagulates with non-ferrous colloids in the contaminated water;

the ferrous hydroxide reacts to produce ferric hydroxide; and the ferric hydroxide forms flocculated particles with non-ferrous minerals in the contaminated water;

introducing the contaminated water into the settling tank via an inlet toward a bottom of the settling tank;

controlling the oxygen concentration within the contaminated water such that at least a portion of the ferric hydroxide is produced after a water level in the settling tank is above the inlet; and permitting precipitates to settle within the settling tank.

4. The method of claim 3, wherein the contaminated water is injected into the settling tank in batches, and further comprising the step of removing a portion of the precipitates from the settling tank such that a remaining portion of the precipitates in the settling tank and causes heterogeneous nucleation in the contaminated water of a subsequent batch.

5. The method of claim 1, wherein the oxygen is injected toward a bottom of a floatation tank, such that the oxygen promotes the formation of ferric hydroxide and causes at least a portion of the precipitates to rise toward a top of the tank.

6. The method of claim 1, wherein at least a portion of the ferrous hydroxide acts as a coagulant and breaks oil emulsions in the contaminated water.

7. The method of claim 1, wherein the ferric hydroxide acts as a flocculant such that the precipitate comprises flocks.

8. The method of claim 1, wherein the contaminated water pH is between about 7.5 and 8.

9. The method of claim 1, wherein the contaminated water is brine water.

10. The method of claim 1, wherein the at least one additional mineral comprises Ca, Mg, Fe, Ba, Sr, NORMs (Naturally Occurring Radioactive Materials), or combinations thereof.

11. The method of claim 1, wherein the contaminated water further comprises BTEX (Benzene, Toluene, Ethylbenzene and Xylene), and liquid hydrocarbons.

12. The method of claim 11, wherein the contaminated water comprises NORMs in solution, and the contaminated water pH is sufficiently low to avoid the formation of NORM-precipitates.

13. The method of claim 1, wherein the contaminated water is oxygenated to achieve a molar concentration of oxygen of about 10% of the molar concentration of ferrous iron.

14. The method of claim 1, wherein the precipitate is separated as a sludge, and wherein the pH of the sludge is reduced to cause the ferric hydroxide to become soluble and form an iron oxide precipitate.

\* \* \* \* \*